United States Patent Office 3,492,506
Patented Jan. 27, 1970

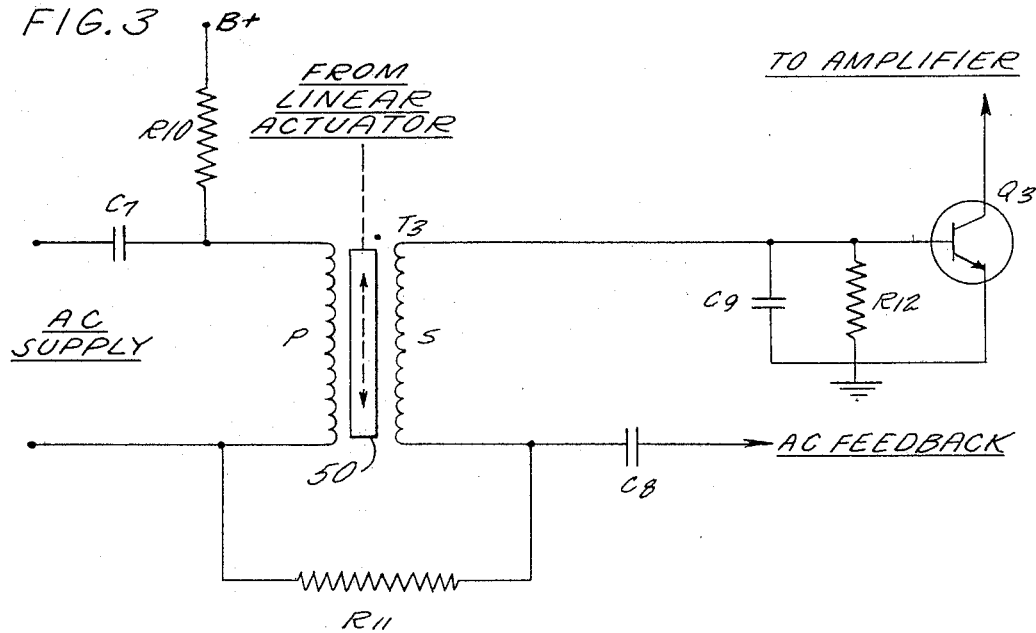

3,492,506
LAG-LEAD AC COMPENSATION CIRCUIT
Henry E. Martin, Wapping, and John E. Games, Granby, Conn., assignors to United Aircraft Corporation, East Hartford, Conn., a corporation of Delaware
Continuation-in-part of application Ser. No. 284,708, May 31, 1963. This application Jan. 26, 1967, Ser. No. 621,384
Int. Cl. H03k 1/12
U.S. Cl. 307—262      5 Claims

ABSTRACT OF THE DISCLOSURE

A circuit for compensating an AC signal in which the AC input signal is transformer coupled to a center-tapped secondary winding, and a capacitor is connected between the center-tap and a common terminal. Each side of the secondary winding is switched to charge the capacitor to a DC voltage. The lag of the circuit is limited by two biased diodes connected across the capacitor.

CROSS-REFERENCE TO RELATED APPLICATIONS

This application is a continuation-in-part of application Ser. No. 284,708 filed May 31, 1963, now abandoned

BACKGROUND OF THE INVENTION

This invention relates to a stability augmentation system for aircraft, and particularly to a system which will stabilize a helicopter in both hover and forward flight in the yaw, pitch, and roll axes.

Stabilization of a helicopter has been found to be desirable because of the basic instability of the uncontrolled craft. The stability augmentation system of this invention will compensate for the normal random attitude changes caused by atmospheric canditions. The pilot will thus find it unnecessary to continuously adjust the controls to keep the craft in the proper control attitude. The sysem will also provide short-term attitude hold capabilities for the craft in its commanded attitude.

One of the desirable features of this invention is the ability of the system to determine when the pilot is commanding a maneuver. When a specified input rate along one axis in one direction is maintained for a specified time interval, the attitude hold capabilities of the stability augmentation system will be disengaged and the craft will respond directly to the pilot's control, with rate damping still being provided. However, the system will not fight the pilot when he wishes to change attitude.

SUMMARY OF THE INVENTION

The basic stability augmentation system incorporates a rate gyro to sense angular rates of the craft around the axis to be stabilized. The rate signal is then compensated to provide the required dynamic characteristics to give an output voltage proportional to the required correction signal necessary to stabilize the craft. This correction signal is amplified as necessary, and fed to a servo motor which drives a linear actuator. The linear actuator is mechanically or hydraulically coupled directly to the proper control surface on the craft. Position feedback proportional to the displacement of the linear actuator is provided by means of a feedback transducer. The basic stability agumentation system is claimed in U.S. Patent 3,199,013.

A novel safety gate circuit is provided in the feedback loop to deactivate the entire control system in the event that a wire from the position feedback transducer opens or shorts to ground. The safety gate circuit is claimed in U.S. Patent 3,215,895.

A novel lag-lead compensation circuit is incorporated in the system to provide the required correction signal to stabilize the craft and also to provide short-term attitude hold capabilities. A lag limiter circuit prevents an overdriving of the lag-lead compensation which might cause excessive delay in the return of the system to the symmetrical authority condition after a disturbance.

The system also incorporates a novel rate sensitive compensation change circuit which determines when the pilot is commanding a maneuver, and which shorts the lag portion of the series compensation leaving only rate feedback around the aircraft. This feature is claimed in U.S. Patent 3,199,013.

An object of this invention is to provide a novel lag-lead compensation circuit for use in a stability augmentation system for aircraft.

A further object of this invention is a lag-lead compensation circuit in which a lag limiter prevents overdriving of the compensation.

Other objects and a fuller understanding of the invention may be had by referring to the following description and claims read in conjunction with the accompanying drawings.

BRIEF DESCRIPTION OF THE DRAWINGS

FIGURE 3 is a schematic circuit diagram of the safety gate circuit of FIGURE 1.

DESCRIPTION OF THE PREFERRED EMBODIMENT

Figure 1:
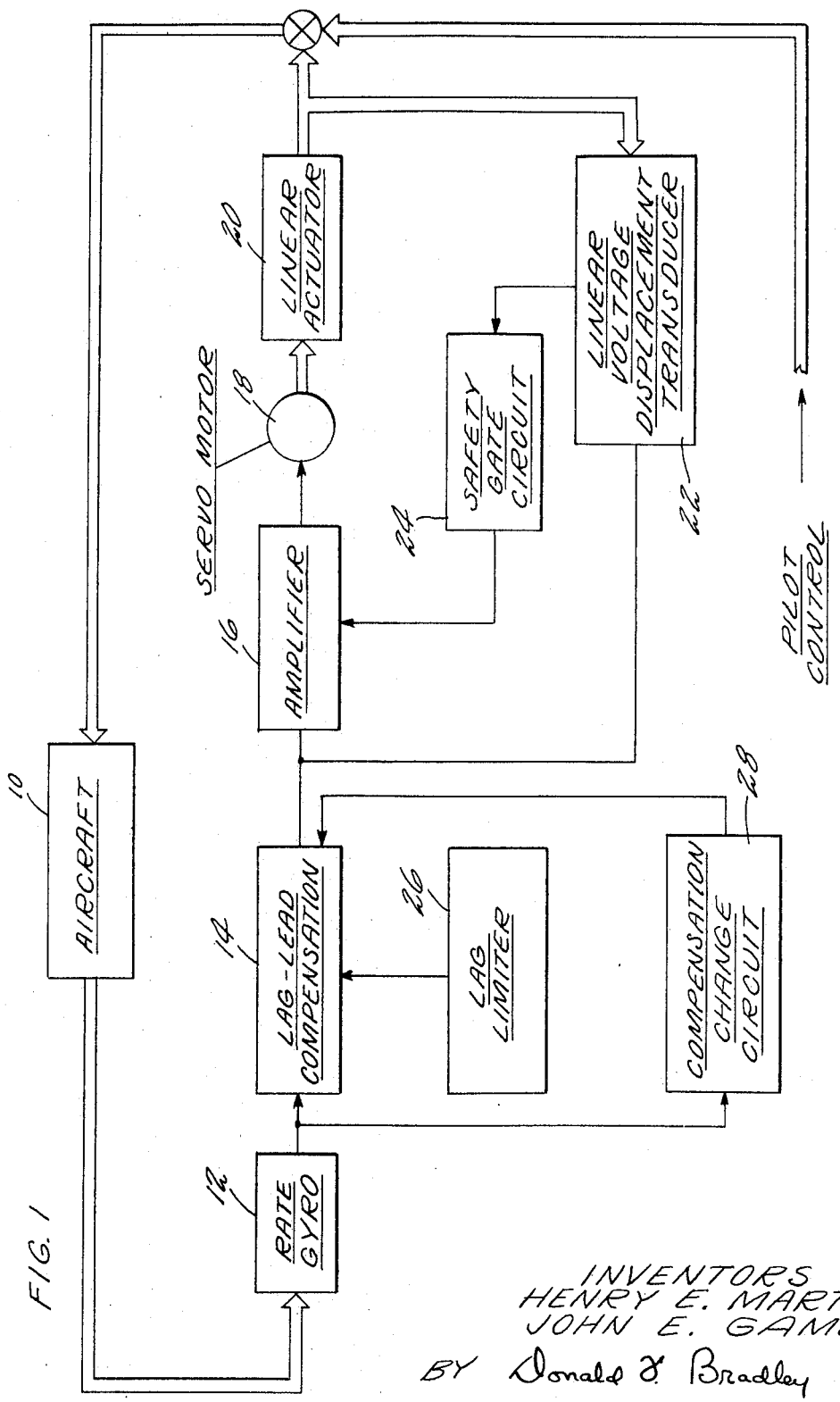
FIGURE 1 shows in block diagram form the stability augmentation system of this invention.

Referring now to FIGURE 1, an aircraft, indicated as reference numeral 10, may be disturbed from its controlled attitude by some outside source such as a wind gust. The angular rate of craft movement about the axis to be stabilized, for example the roll axis, is sensed by rate gyro 12. It should be pointed out here that the stability augmentation system may be used to stabilize the craft in either pitch, roll or yaw. Gyro 12 produces an AC output voltage which is proportional to the angular rate of craft deviation. The gyro output voltage is fed to the lag lead compensation network 14 where the signal is compensated to provide the required dynamic characteristics to produce an output voltage proportional to the correction signal required to stabilize the craft.

After compensation, the rate signal is amplified as needed by amplified 16, and fed to servo motor 18. Motor 18 drives a linear actuator 20 which provides a linear output velocity proportional to the applied rate-error signal. The linear actuator is connected through lingages to some control surface of the craft, such as an aileron or rudder. Pilot inputs are provided to the aircraft by the normal pilot controls.

Position feedback is provided by means of a linear voltage displacement transducer (LVDT) 22 which provides feedback proportional to the linear actuator displacement. A safety gate circuit 24 is provided to deactivate the control by opening the amplifier ground connection in the event that a wire in the position feedback transducer opens or shorts to ground. Safety gate circuit 24 will be described in detail later, and is shown schematically in FIGURE 3.

Lag limiter network 26 is connected with the lag-lead compensation network 14, and prevents an overdriving of the lag-lead compensation which might cause excessive delay in the return of the system to a symmetrical authority condition. The lag limiter will also be described in detail in connection with FIGURE 2

Compensation change circuit 28 essentially responds to the rate input from gyro 12 and changes the lag-lead compensation of circuit 14 to full proportional compensation. A specified input rate in one direction must be maintained for a specified time interval for the compensation changer circuit to be activated. The circuit senses when the pilot is commanding a maneuver, and then destroys any attitude holding capabilities of the system and provides rate damping in the system. This function prevents the system from fighting the pilot when he wishes to change attitude. When a new attitude is achieved, and the input rate about the axis falls to zero, the system reverts back to the normal lag-lead compensation, and limited attitude hold capabilities are again provided at the commanded attitude. Since a specified input rate in one particular direction must be maintained for a specified time interval, random wind gust disturbances, which might cause high enough rates to trip the compensation changer circuit, will be discriminated against since they will not tend to be maintained in one direction for a long enough interval of time. Therefore, the stabilizing effect of the system will be unimpaired.

Figure 2:
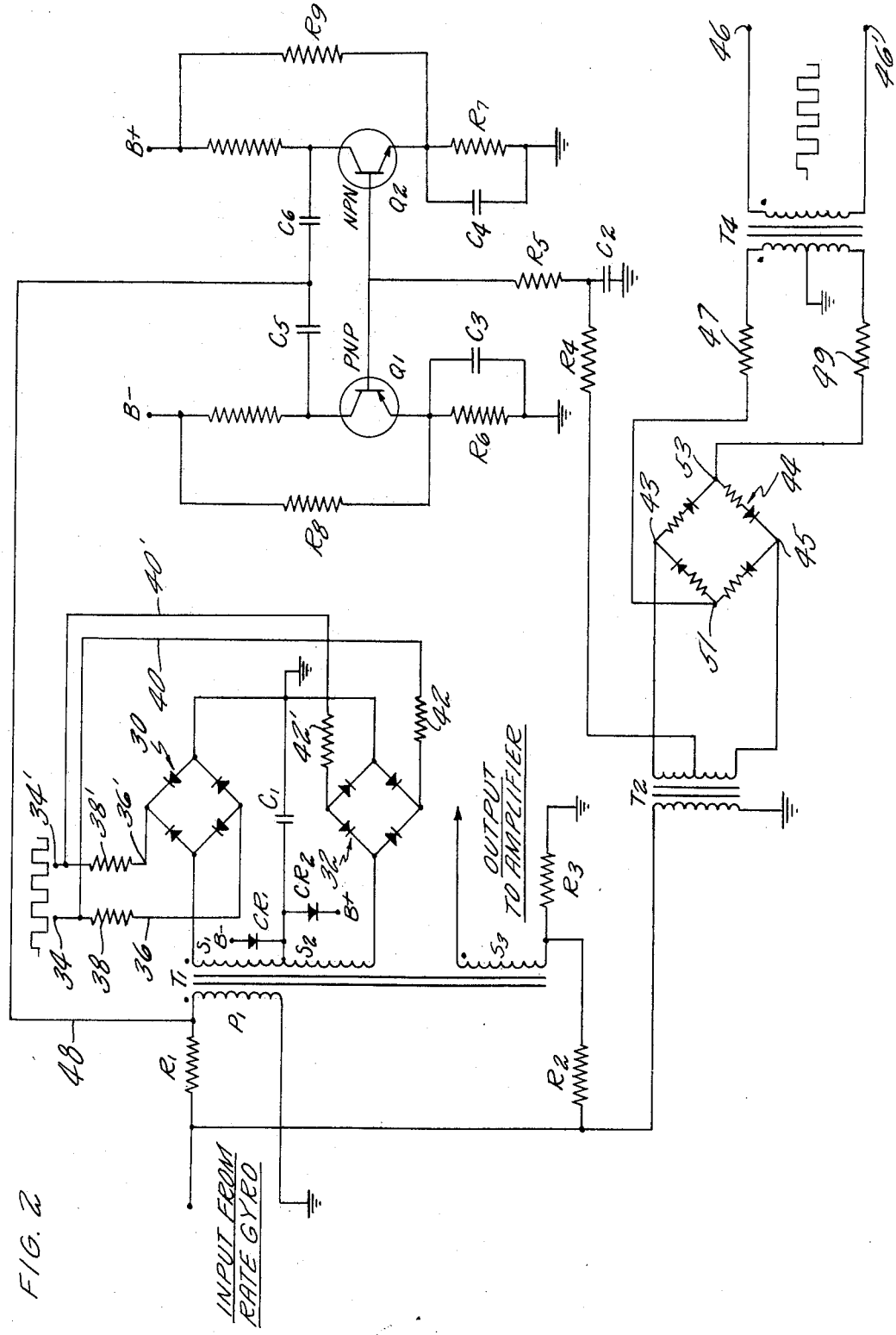
FIGURE 2 is a schematic circuit diagram of the compensation networks of FIGURE 1.

FIGURE 2 shows schematically the electronics of lag-lead compensation circuit 14, lag limiter circuit 26 and compensation change circuit 28. The AC input signals from rate gyro 12 are applied through resistor $R_1$ across primary winding $P_1$ of transformer $T_1$. The output of the rate gyro is a 400-cycle AC signal having an amplitude proportional to the rate about the craft axis. The phase of the gyro output signal is dependent on the direction of deviation about the axis, the signal being either in phase or 180° out of phase with the gyro excitation signal.

The input signal across primary winding $P_1$ is transferred to the secondaries of the transformer $S_1$, $S_2$ and $S_3$. Winding $S_3$ is the output winding, and this signal is fed directly to amplifier 16.

The signal appearing across secondary winding $S_1$ and $S_2$ is alternately chopped to ground by diode switches 30 and 32. A square-wave input supply having its center tap grounded supplies alternate positive and negative signals to terminals 34 and 34'. The frequency of the square wave is identical to that of the gyro signal. The gyro excitation signal and the square wave signal are provided from the same inverter supply.

The square-wave input voltage is fed through lines 36 and 36' having series resistors 38 and 38' to opposite junctions of diode bridge 30. Likewise the square-wave voltage is fed through lines 40 and 40' having series resistors 42 and 42' to opposite junctions of diode bridge 32. The diodes in bridge circuits 30 and 32 are poled in such a direction that one of the bridge circuits is always conducting, and the bridge circuits conduct alternately as the square-wave input changes polarity. For example, when junction 34 is positive and junction 34' is negative, the diodes in bridge circuit 30 are forward biased. At the same time, the diodes in bridge circuit 32 are reverse biased. The diode bridge circuits act as switches, the switch being open when the diodes are not conducting and the switch being closed when the diodes are conducting. Thus with junction 34 positive and junction 34' negative, switch 30 is closed and switch 32 is opened. When the polarity of the square-wave signal changes so that junction 34 is negative and junction 34' is positive, switch 32 will be closed and switch 30 will be open.

As the input rate signal across $P_1$ is transferred to secondary windings $S_1$ and $S_2$, capacitor $C_1$ will charge either positively or negatively depending on the phase relationship between the input signal and the square-wave switching supply. For example, when the input signal is such that the polarity of the signal at the end of the windings having the dot is positive with respect to the other end of the windings, and if diode bridge 30 is closed and diode bridge 32 is open at this time, diode bridge 30 will act as a substantially zero impedance to the signal. Thus the dotted portion of secondary winding $S_1$ is effectively grounded. Capacitor $C_1$ will charge negatively with respect to ground at this time. During the negative half cycle of the input signal, diode bridge 32 will be closed and diode bridge 30 will be open. However, since the polarity of the signal across secondary windings $S_1$ and $S_2$ has also changed, capacitors $C_1$ will still receive a negative charge.

If the input rate of the gyro is in the opposite direction, the gyro output signal will be reversed in phase by 180°, and capacitor $C_1$ will therefore be charged to a positive potential with respect to ground.

When an attitude change of the aircraft causes a step change in the envelope of the rate gyro output signal, capacitor $C_1$ will act as an AC short and there will be no output across winding $S_3$ except for a small AC lead signal to be described subsequently. The impedance of capacitor $C_1$ will be reflected across the transformer to the primary circuit and appear across primary winding $P_1$. Capacitor $C_1$ will charge gradually and the output across secondary winding $S_3$ will grow exponentially. The time constant of the circuit will be approximately $R_1 (S_1/P_1)^2 C_1$. If a step-up transformer is used, both $C_1$ and $R_1$ can be made small and still allow relatively long time constants in the circuit. There will be a very small voltage loss in the circuit if the inductance of primary winding $P_1$ is large.

In addition to the AC lag caused by the capacitor action as just described, an AC lead is also produced by the circuit. This is caused by the fact that the winding resistance of secondary windings $S_1$ and $S_2$ will alternately appear in series with $C_1$. In addition, a small resistor may be placed in series with $C_1$ to regulate the lead depending on the resistance of the secondary windings.

Thus the circuit as just described is a pure AC lag-lead circuit. When a step input appears across primary winding $P_1$, the lead portion of the circuit produces an almost instantaneous small change in the signal across output winding $S_3$. After this instantaneous lead action, the output signal will build up exponentially because of the lag produced in the circuit. The equivalent circuit may be represented by a small resistor and a capacitor in series across primary winding $P_1$.

The circuit lead may also be adjusted by adding proportional feedthrough by way of resistors $R_2$ and $3_3$. Thus, in addition to lag-lead compensation applied to the rate signal, a pure rate signal is added to the system at winding $S_3$. Varying the values of resistors $R_2$ and $R_3$ will adjust the amount of rate signal.

The linear actuator 20 is a mechanical device having stops which limit the authority of the position loop. Since the position loop is preceded by a lag produced in the series compensation, overdriving of the series compensation can occur to produce an unwanted delay before the proportional loop is recentered. If the electrical output from the series compensation is limited after the mechanical limits have been reached, the overcharging and the resulting lag will be prevented. Lag limited circuit 26 of FIGURE 1 limits the electrical output of the lag-lead compensation network. The lag limiting is provided by diodes $CR_1$ and $CR_2$ connected across capacitor $C_1$. If the diodes are properly back biased by voltages of selected magnitudes, the diodes will conduct and limit the charge which can appear across capacitor $C_1$.

Compensation change circuit 28 automatically varies the compensation of the system during maneuvers to eliminate the attitude holding capabilities of the system. If it is assumed that a maneuver is being commanded by the pilot when a rate of change above a certain threshold value is maintained in one direction for a given interval of time, the output of the rate gyro may be used to determine when a maneuver is taking place. When the maneuver detector indicates that a maneuver is being commanded by the pilot, the lag portion of the series compensation is shorted, leaving only rate feedback around the aircraft.

FIGURE 2 shows the operation of the compensation change circuit. Referring now to FIGURE 2, the AC rate signal from gyro 12 is fed across the primary winding of transformer $T_2$. The secondary winding of transformer $T_2$ is connected across opposite junctions 43 and 45 of diode bridge 44.

A square-wave supply, not shown, of the same frequency as the AC rate signal from gyro 12, is applied to the primary winding of transformer $T_4$ at junctions 46 and 46'. The secondary winding of transformer $T_4$ has a grounded center-tap, and the ends of the secondary winding are connected through resistors 47 and 49 across opposite junctions 51 and 53 of diode bridge 44.

During alternate half-cycles of the AC input to transformer $T_4$, current flows through alternate portions of diode bridge 44. For example, when the dotted end of transformer $T_4$ is positive, current flows through resistor 47, junctions 51, 43 and 53 and the diodes connected in this path, and back through resistor 49. When the dotted end of transformer $T_4$ is negative, current flows through resistor 49, junctions 53, 45 and 51 and the diodes connected in this path, and back through resistor 47.

If resistors 47 and 49 are equal, and the resistance in each leg of the diode bridge 44 is equal, junction 43 will be effectively grounded during one half-cycle, and junction 45 will be effectively grounded during the other half cycle. Each half of the secondary winding of transformer $T_2$ is thus alternately grounded, and diode bridge 44 thus acts as a switch, demodulating the signal appearing across transformer $T_2$. Depending on the phase between the AC rate signal and the square-wave signal at transformer $T_4$, either in phase or 180° out of phase, a DC signal of either positive or negative polarity appears at the center-tap of the secondary winding of transformer $T_2$. This DC signal, which is proportional to the rate and direction of aircraft deviation about the axis, is fed to a lag network comprising resistor $R_4$ and capacitor $C_2$. The lagged DC signal is then applied through resistor $R_5$ to the base junctions of transistors $Q_1$ and $Q_2$. Transistor $Q_1$ is a p–n–p transistor, and is normally non-conducting. The emitter of transistor $Q_1$ is normally biased somewhat negative from voltage source B— through resistors $R_8$ and $R_6$ to ground. Transistor $Q_2$ is an n–p–n– transistor and is also normally non-conducting. The emitter junction of this transistor is normally biased somewhat positive by voltage source B+ through resistors $R_7$ and $R_9$ to ground. If the voltage across capacitor $C_2$ swings more negative than the voltage at the emitter of transistor $Q_1$, $Q_1$ will fire and provide a low impedance path for the rate signal from the gyro. This path will be through resistor $R_1$, line 48, capacitor $C_5$, through the transistor $Q_1$ and through capacitor $C_3$ to ground. This path will effectively short out the lag capacitor $C_1$ by way of the transformer action of $T_1$. Likewise if the voltage across capacitor $C_2$ is more positive than the emitter voltage of transistor $Q_2$, transistor $Q_2$ will fire and the lag capacitor $C_1$ will be shorted out through wire 48, capacitor $C_6$, transistor $Q_2$ and capacitor $C_4$ to ground. The shorting action is caused primarily by capacitors $C_3$, $C_4$, $C_5$ and $C_6$ which provide the low AC impedance required when one or the other of the transistors fire. Thus regardless of whether the movement about the axis of the craft is clockwise or counterclockwise, the rate signal produced by the gyro, which is proportional to both rate and direction, will be fed across lag capacitor $C_2$. If the signal lasts for a time determined by the time constant of the lag circuit, the lag capacitor $C_2$ will be charged sufficiently to switch on either transistor $Q_1$ or $Q_2$ and short the rate gyro input signal around the lag-lead compensation network. Thus the circuit senses when the pilot has deliberately commanded the craft attitude change, and eliminates this compensation portion of the stability augmentation system. The only signal which now appears is the pure rate feedback around the aircraft via resistors $R_2$ and $R_3$.

FIGURE 3 shows schematically the linear voltage displacement transducer 22 and the safety gate circuit 24. Slug 50 is directly connected to the output of the linear actuator 20, and is moved back and forth between the primary and secondary windings of transformer $T_3$ to vary the coupling across the transformer. An alternating current supply, not shown, provides AC across the primary winding of transformer $T_3$. The voltage across secondary winding S, which is determined by the position of the slug 50, is fed to the input of amplifier 16. This feedback signal is proportional to the displacement of the linear actuator.

The safety gate circuit comprises a DC path around the transformer $T_3$ which will sense if either the primary or secondary windings are opened or shorted to ground. A source of DC voltage, B+, provides current through resistor $R_{10}$, through primary winding P, then through resistor $R_{11}$ and through secondary winding S to ground through resistor $R_{12}$. Capacitors $C_7$ and $C_8$ block the DC voltage in the AC transformer lines. The amount of current provided through the path need only be sufficient to cause a large enough voltage drop across resistor $R_{12}$ to produce a positive bias at the base of transistor $Q_3$ to keep transistor $Q_3$ saturated. Transistor $Q_3$ is part of the ground system for the first stage of amplifier 16. If either primary winding T or secondary winding S of transformer $T_3$ opens or shorts to ground, the current path will be broken and transistor $Q_3$ will be turned off because there will no longer be a base voltage. This will open the ground system for the power amplifier, and the entire system will be deactivated. Capacitor $C_9$ across resistor $R_{12}$ acts as an AC ground return path.

While the invention has been described in terms of a stability augmentation system for aircraft, and particularly for helicopters, it need not be limited thereto but may be used wherever stability augmentation or automatic stabilization may be desirable. One obvious example is the use of such a system for stabilizing hydrofoil craft. In addition, the novel circuits described need not be limited to their specific function in this system, but may be used wherever an electronic circuit of this sort is desirable.

While the invention has been described in its preferred embodiment, it need not be limited thereto. Many modifications and changes may be made in the details of construction without departing from the scope of the invention as hereinafter claimed.

We claim:
1. An AC lag-lead compensation circuit comprising
   a transformer having an input winding, a secondary winding and an output winding, said secondary winding having an inherent resistance,
   switch means connected in series between each end of said secondary winding and a common junction,
   a center-tap connection on said secondary winding,
   a capacitor connected between said center-tap and said common junction,
   means for supplying an alternating input signal to said input winding, said input signal having one of two opposite phase states,
   control means for alternately opening and closing each of said switch means at the same frequency as said alternating input signal whereby one of said switch means is open when the other of said switch means is closed,
   said capacitor being charged to one polarity when said input signal is in one phase and being charged to the opposite polarity when said input signal is in the opposite phase,
   said output winding producing an AC output signal proportional to said input signal, changes in said input signal being lagged exponentially at said output winding as said capacitor is charged, and
   means including the resistance of said secondary winding and said capacitor for producing a small in- stantaneous leading phase on the voltage across said output winding relative to said input signal.

2. An AC lag-lead circuit as in claim 1 and including means to limit the charge on said capacitor.

3. An AC lag-lead circuit as in claim 2 in which said limiting means includes first and second diodes, each said diode having one terminal connected to said transformer center-tap, the other terminal of each diode being connected to a source of DC voltage.

4. An AC lag-lead circuit as in claim 1 in which said switch means are diode bridge circuits.

5. An AC lag-lead circuit as in claim 1 in which said transformer is a step-up transformer.

References Cited
UNITED STATES PATENTS

| | | | |
|---|---|---|---|
| 2,562,912 | 8/1951 | Howley | 307—232 X |
| 2,975,299 | 3/1961 | Mintzer | 307—232 |
| 3,029,386 | 4/1962 | Ricker | 328—133 X |
| 3,239,768 | 3/1966 | Sikorra | 328—133 X |

DONALD D. FORRER, Primary Examiner

R. C. WOODBRIDGE, Assistant Examiner

U.S. Cl. X.R.

307—257, 295; 318—448; 328—155